US008707453B2

(12) United States Patent
Ivey

(10) Patent No.: US 8,707,453 B2
(45) Date of Patent: Apr. 22, 2014

(54) SYSTEM AND METHOD FOR RESTRICTING ACCESS TO A COMPUTER SYSTEM TO LIVE PERSONS BY MEANS OF SEMANTIC ASSOCIATION OF IMAGES

(75) Inventor: Christopher Liam Ivey, Ottawa (CA)

(73) Assignee: Christopher Liam Ivey, Ottawa, ON (CA)

(*) Notice: Subject to any disclaimer, the term of this patent is extended or adjusted under 35 U.S.C. 154(b) by 986 days.

(21) Appl. No.: 12/696,053

(22) Filed: Jan. 29, 2010

(65) Prior Publication Data

US 2011/0191820 A1 Aug. 4, 2011

(51) Int. Cl.
*G06F 7/04* (2006.01)
(52) U.S. Cl.
USPC .......................................................... 726/28
(58) Field of Classification Search
USPC .......................................................... 726/28
See application file for complete search history.

(56) References Cited

U.S. PATENT DOCUMENTS

| | | | | |
|---|---|---|---|---|
| 6,195,698 | B1* | 2/2001 | Lillibridge et al. | 709/225 |
| 6,240,424 | B1* | 5/2001 | Hirata | 707/749 |
| 6,954,862 | B2* | 10/2005 | Serpa | 726/2 |
| 7,139,916 | B2* | 11/2006 | Billingsley et al. | 713/182 |
| 7,149,899 | B2* | 12/2006 | Pinkas et al. | 713/182 |
| 7,197,646 | B2* | 3/2007 | Fritz et al. | 713/182 |
| 7,603,706 | B2* | 10/2009 | Donnelly et al. | 726/22 |
| 7,606,915 | B1* | 10/2009 | Calinov et al. | 709/229 |
| 7,917,508 | B1* | 3/2011 | Baluja et al. | 707/736 |
| 7,929,805 | B2* | 4/2011 | Wang et al. | 382/298 |
| 2007/0277224 | A1* | 11/2007 | Osborn et al. | 726/2 |
| 2008/0066014 | A1* | 3/2008 | Misra | 715/846 |
| 2008/0127302 | A1* | 5/2008 | Qvarfordt et al. | 726/2 |

OTHER PUBLICATIONS d'Heureuse, Protecting SIP-based Networks, 2008, Retrieved from the Internet <URL: ieeexplore.ieee.org/xpls/abs_all.jsp?arnumber=4698859&tag=1>, pp. 1-5 as printed.*
Shahreza, Drawing CAPTCHA, 2006, Retrieved from the Internet <URL: ieeexplore.ieee.org/xpls/abs_all.jsp?arnumber=1708527>, pp. 1-6 as printed.*
Shah, Drag and Drop Image CAPTCHA, 2008, Retrieved from the Internet <URL: sprouts.aisnet.org/8-46>, pp. 1-16 as printed.*
Basso, Preventing massive automated access to web resources, 2008, Retrieved from the Internet <URL: www.sciencedirect.com/science/article/pii/S0167404808001156>, pp. 1-15 as printed.*

(Continued)

*Primary Examiner* — Michael Chao
(74) *Attorney, Agent, or Firm* — Christopher Liam Ivey

(57) ABSTRACT

A system and method for restricting access to a computer system, resource, or network to live persons, and for preventing the execution of automated scripts via an interface intended for human interaction. When queried for access to a protected resource, computer system, or network, the system will respond with a challenge requiring unknown petitioners to solve a visual puzzle before proceeding, said puzzle consisting of a collection of apparently random objects, and exploiting the natural human impulse to form semantic or symbolic associations between images of objects. The subject of the test must either recognize a semantic or symbolic association between two or more objects, or isolate an object that does not belong with the others, indicating their selection with the pointing device on their local computer. If the subject succeeds in passing the test they are granted access to the requested resource, computer system, or network.

17 Claims, 2 Drawing Sheets

201: Background Image
202: Key Image photo object
203: Corresponding Image Object
204: Unrelated Image Objects
205: Pseudo-Random Image Noise
206: Localized Instruction String
207: Match Indicated by User

(56) References Cited

OTHER PUBLICATIONS

Oviatt, Integration and Syncrhonization of Input Modes during Multimodal Human-Computer Interaction, 1997, Retrieved from the Internet <URL: dl.acm.org/citation.cfm?id=1621587>, pp. 1-13 as printed.*

Okamoto, GPC: Graphical Pen-Based Captcha, 2009, Retrieved from the Internet <URL: plw.media.mit.edu/people/mud/media/GPC.pdf>, pp. 1-8 as printed.*

Shirali-Shahreza, Collage CAPTCHA, 2007, Retrieved from the Internet <URL: ieeexplore.ieee.org/xpls/abs_all.jsp?arnumber=4555329&tag=1>, pp. 1-4 as printed.*

Neal R. Wagner, Verifyin the Presence of Humans: Three Approaches, 2003, Retrieved from the Internet <URL: .cs.utsa.edu/~wagner/captcha/>, pp. 1-5 as printed.*

(No stated author), Microsoft Research Asirra project, 2007, Retrieved from the Internet <URL: web.archive.org/web/20070328143406/http://research.microsoft.com/asirra/>, pp. 1-3 as printed.*

* cited by examiner

Figure 1: Logical Arrangement of the System
101: Unknown Agent (human or machine)
102: Verification Server
103: Challenge / Response Agent
104: Protected Resource
105: Test Creation Engine
106: Images Database
107: Semantic Context Database
108: Localization Engine
109: Image Composition Engine
110: Test Evaluation Engine
111: Human Metadata Aggregators
112: Client Side Test Application
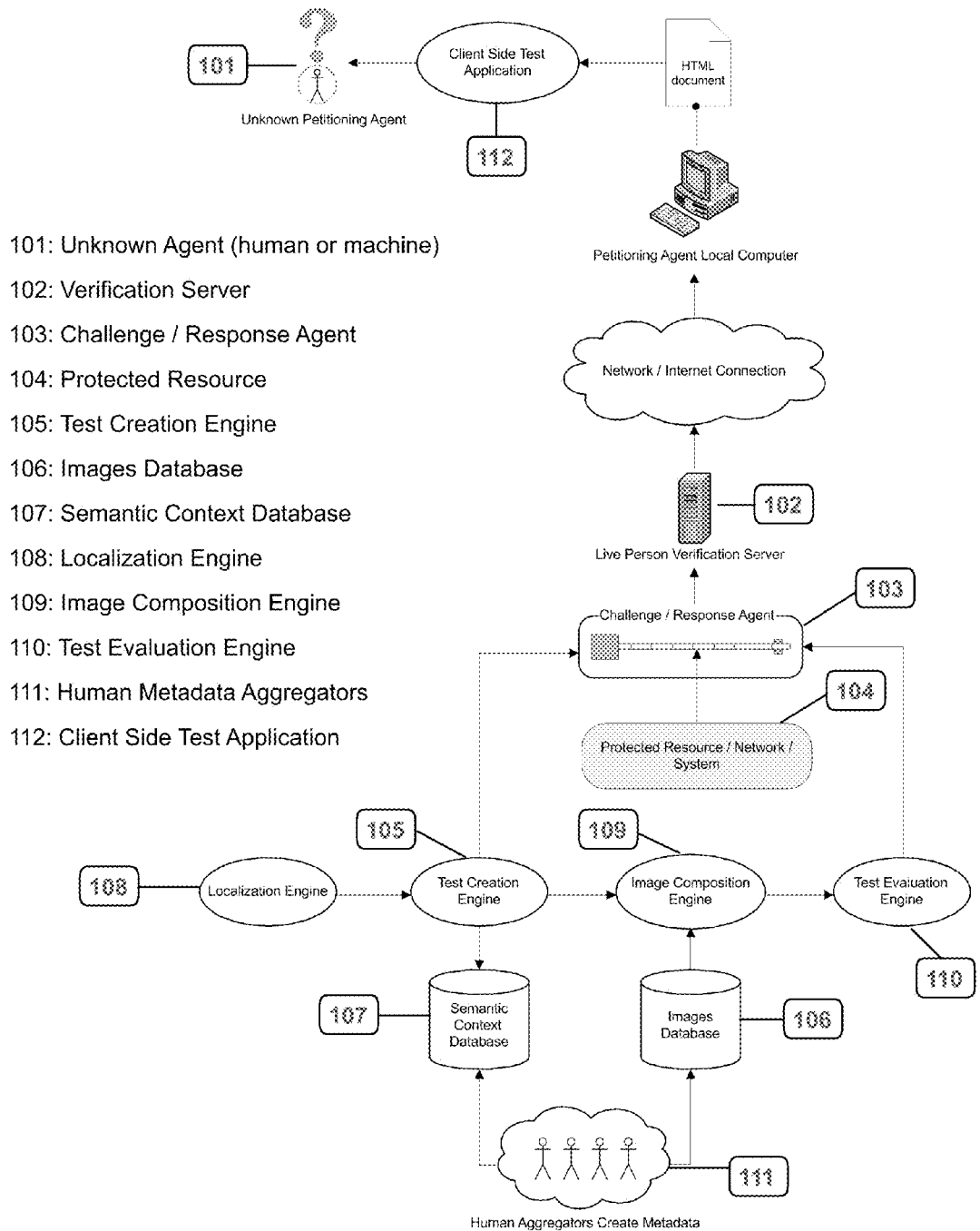

Figure 2: Typical Configuration of a Composite Test Image
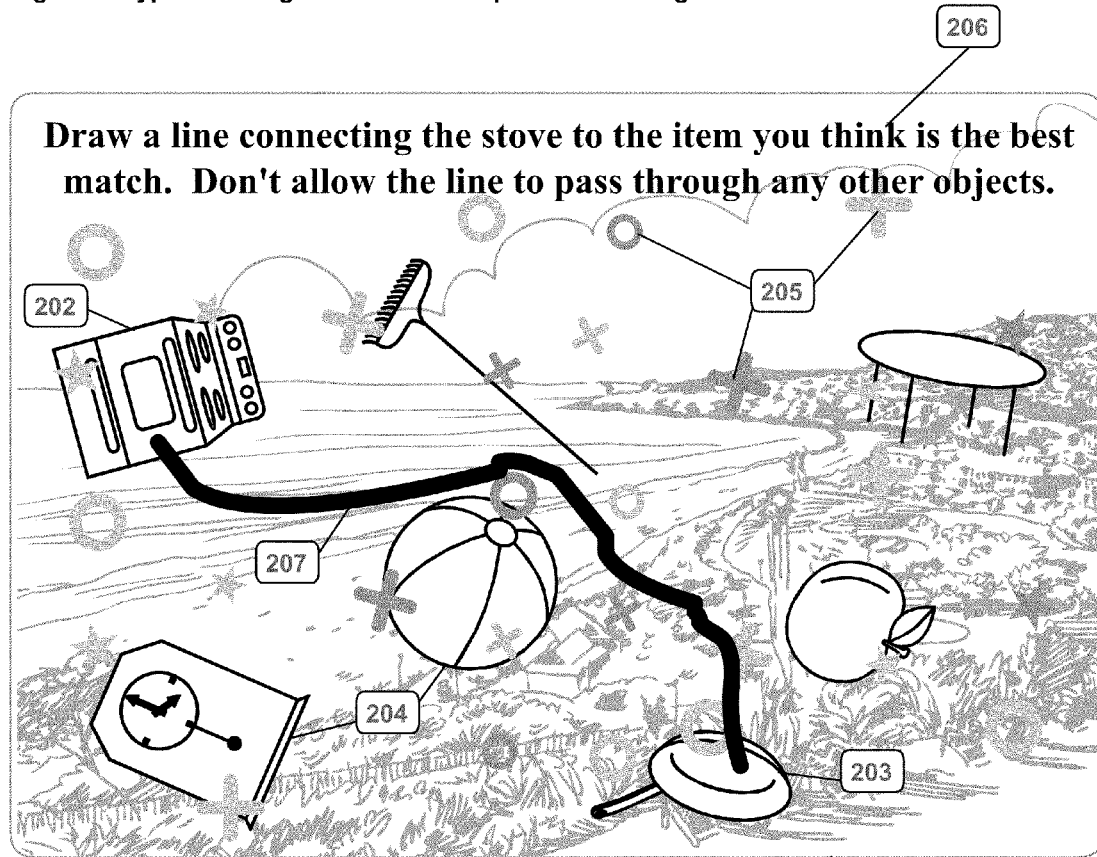
201: Background Image
202: Key Image photo object
203: Corresponding Image Object
204: Unrelated Image Objects
205: Pseudo-Random Image Noise
206: Localized Instruction String
207: Match Indicated by User

SYSTEM AND METHOD FOR RESTRICTING ACCESS TO A COMPUTER SYSTEM TO LIVE PERSONS BY MEANS OF SEMANTIC ASSOCIATION OF IMAGES

REFERENCES

U.S. Patent Documents

| | | |
|---|---|---|
| 7,603,706 | October 2009 | Donnely, et al. |
| 7,606,915 | October 2009 | Calinov, et al. |
| 7,197,646 | March 2007 | Fritz, et al. |
| 7,149,899 | December 2006 | Pinkas, et al. |
| 7,139,916 | November 2006 | Billingsley, et al. |
| 6,954,862 | October 2005 | Serpa, Michael Lawrence |
| 6,240,424 | May 2001 | Hirata, Kyoji |
| 6,195,698 | February 2001 | Lillibridge, et al. |

OTHER REFERENCES

1. Alan Turing, "Computing Machinery and Intelligence", *Mind* (journal), 1950
2. Gregg Keizer, "Spammers' bot cracks Microsoft's CAPTCHA: Bot beats Windows Live Mail's registration test 30% to 35% of the time, says Websense", *Computerworld'*, February, 2008

BACKGROUND OF THE INVENTION

The Problem

In his 1950 paper *Computing Machinery and Intelligence*[1], Alan Turing proposed his now famous test, in which a computer is said to be thinking if it can win a game in which a human judge attempts to distinguish between human and mechanical interlocutors.

However, over time it has become apparent that the inverse of that question has become more pressing: can a machine distinguish between human operators and other machines?

The reason for this is that commercial and social networking applications on the Internet are becoming increasingly plagued by unscrupulous marketers, and opportunists who use software to exploit interfaces intended for human users to flood websites, online forums and mail servers with unsolicited marketing—or worse yet, by criminals who exploit weaknesses in human interfaces to capture data for fraudulent purposes.

If a person is limited to interacting with a computer system by physically typing requests, the amount of data he can gather, and the amount of damage he can do is limited; but with the aid of malicious software, a single operator can flood a network with millions of spam messages, or make thousands of requests for data in just a few seconds.

It turns out that limiting human interfaces to human operators is a critical task, and a substantial amount of intellectual property has been devoted to this problem—especially in the past few years. The so-called "Reverse Turing Test" has become an important problem for software developers.

The problem is that none of the current technologies are completely effective. Automated programs created by spammers have proven to be as much as 35%[2] effective when deployed against commercial solutions like Microsoft's Live Mail and Google's Gmail service.

Most of the research so far has focused on the mechanical aspects of how human beings recognize images, and a lot of effort has gone into discovering ways to distort images so they are still human-recognizable, but are computationally expensive for machines to resolve.

The standard "Captcha", or reverse Turing test uses a sequence of glyphs, (letters and numbers), that have been run together, or warped, or have lines drawn through them, or have otherwise been altered to make them difficult to isolate and classify.

For their part, spam marketers and other agents who want to break live person verification systems have been developing technology to break down the job of recognition into three steps: preprocessing and noise reduction; segmentation; and classification.

The problem with using simple glyphs like letters and numbers is that there aren't many of them that are in regular use by humans, (for practical purposes they're pretty much limited to the characters on a typical computer keyboard), and in order to be recognizable at all, they must obey basic rules with regard to silhouette. This means that if you distort the glyphs enough that they can't readily be classified with software, human readers likely won't be able to recognize them either.

Some developers have attempted to use shape or image recognition instead of glyphs as a reverse Turing test. For example, Microsoft's Asirra uses a database of pet images provided in partnership by Petfinder.com. Users are asked to separate cats from dogs in a list of photographs.

Here again, there's a problem. Spam marketers who wish to break image recognition tests have demonstrated that they can simply enlist human agents to collect and classify images from very large databases in a surprisingly short time. From that point on, it's simply a matter of digital "grunt work" to compare known images with those presented by a reverse Turing test. This is the kind of work that computers excel at.

Systems that use shape recognition as a reverse Turing test can be broken by a similar process and with even less effort, since you generally have to use a restricted range of simple silhouettes that won't confuse human users.

The fact is, computers have become so powerful and inexpensive that you can't rely on computational expense to protect computer networks from machine agents.

An Epistemological Approach

Curiously, most of the research I have read in this field is related to the mechanical process of how people see—how they isolate shapes from the background, and segment them into individual objects.

There seems to be a surprising lack of epistemological curiosity as to how it is that humans know what a thing is once they have perceived it. Machines can be trained to perceive things. For many academics jury is still out as to whether they can ever know things.

For my part, I don't believe they can. A computer is a remarkably simple machine that inhabits an entirely pragmatic and platonic universe: it can only recognize a thing by comparing it against the same thing. Otherwise, it can only compare similarities.

You can use a machine to compare apples to oranges, but to a computer, an apple can only be said to be an apple if it's the same apple you started with. Only human beings can encompass the idea of an apple.

In other words, human beings recognize objects as ideas. More importantly, they can just as quickly grasp a whole host of associations between ideas that are unpredictable, in some cases illogical—and always human.

It is these semantic associations that tell us, for example, that a shabby, comfortable chair belongs at a cheerful fireside, while a sleek plastic office chair does not.

I believe that in the long run, the only truly successful test for a human presence on a computer system requires that we exploit the semantic and symbolic associations that a human being can make—and will always try to make in any random collection of objects; and that a machine by definition can not.

To be successful, a reverse Turing test can only be composed or created by a human agent, although it can be administered by a machine.

The Proposed Test

What I propose in this invention is a system where a computer will assemble a visual test out of associations created in advance by human operators. Essentially, there are two variations on the test: one is to find two or more objects in an apparently random collection that should go together. In the other variation, the subject has to find the object that doesn't belong—much like the old association game on the PBS television program, Sesame Street.

Because of the arbitrary fashion in which humans associate things, a relatively small database of images can result in thousands of matches—often incorporating the same objects in different ways. For example, consider the following objects: dog, boy, steak, frying pan, fish, baseball bat, baseball, table, and chair.

The dog is compatible with the boy, the ball, the steak, and possibly the fish, but not the table or the frying pan. The steak and the fish are compatible with the frying pan, and possibly the table, but the table is more compatible with the chair.

Humans will naturally associate images that have the strongest association, so if they are asked to match the table with any of the other objects, they will almost always choose the chair. After all, you almost always sit on a chair when at a table—but the steak and the fish or confusing. A human being will cast about looking for a plate and possibly a knife and fork.

This is because humans instinctively organize objects in collections. A machine has no way of making the arbitrary associations that allow humans to collect objects that often have no immediate and discernible qualities in common.

Subtle differences in objects can affect their association as well. It makes sense to associate a boy and his dog, but it makes more sense to the person taking the test if the dog is a beagle than it does if the dog is a pit bull terrier.

How it Would Work

We can create a test that can be assembled and administered by a machine, but only if the essential semantic associations that it is based on are first created by human operators. The test would be assembled from photo objects, each of which would be associated with metadata recorded by human operators.

Semantically, we tend to classify objects in three ways: qualitatively, or in terms of its own properties, (is it soft, or hard, or shiny?); functionally, or in terms of what it does; and in terms of its emotive context, (how does it make you feel?).

Each image would be represented in a database with three sets of metadata which would consist of tags describing the emotive, qualitative, and functional properties of the object with keywords. And—this is the important part—the metadata would have to be created by human operators who would describe the objects in the images in human terms.

The test could then be assembled by an artificial intelligence methodology that simply weighted sets of images based on the correspondence of metadata in each of the three categories. The test would be effectively tunable in terms of "fuzziness", (based on the broadness of the correspondence of keywords over the categories), and difficulty, (by simply forcing users to differentiate between matches where there are points of correspondence between all of the images).

Mechanical Improvements

Naturally, I have given thought to increasing the computational expense of collecting photo objects from the test and trying to re-create the relationships that are used in the test. In this case, I believe that the advantage lies with the agency administering the test rather than those who try to break it.

This is because they can only program computers to recognize the specific photo objects they encounter. They will need to employ human effort to associate the images and rebuild relationships, which is far more difficult in a fluid system than merely collecting images, especially since they can only solve for relationships amongst images they have already encountered, (which means the reverse-engineer effort is not easily distributable).

However, there is a very simple way to make it prohibitively difficult to collect and extract the photo objects used in any given collection: to do this, they would be overlaid on a photo background with a busy texture, using a soft edge and random variations in rotation and scaling. Once all of the images are assembled, the resulting composite would have a randomly modulated blend texture applied to it. The blend texture would be a regular shape repeated at random intervals and positions, and blended using a variety of additive, multiply or subtractive methods with a varying, low alpha.

Since photo objects are inherently more complex than glyphs, less distortion is required in order to render them useless for comparison and classification, yet is possible to subject them to more distortion and to completely change their orientation while they still remain recognizable. Because of this, the resulting image would still be highly recognizable to humans, but not easily compared to other instances of the same thing.

The Case for Restricting the Embodiments to Images

There are some patents that deal with using audio cues to administer a reverse Turing test. Some involve identifying spoken letters and numbers, and one proposal suggests requiring users to type in rhythm with an audio cue.

By extension, you could require test subjects to identify and associate audio cues. With a little imagination, one can easily see how, for example, a human might associate the melody from "Happy Birthday" with the sound of children laughing, or the sound of tissue paper tearing.

Humans also have an innate ability to recognize melodic structure, so a similar test might involve matching snippets of the same melody recorded a cappella or using different instruments.

However, there are two problems with using audio cues in a reverse Turing test. The first is that audio cues are very easy to collect and match by mechanical means, and humans are far more easily confused by alterations in sound than machines. Reversing an audio clip wouldn't disguise it from an audio matching program, but would make it unrecognizable to most humans.

The second problem is simply on of convenience. Most sighted persons primarily interact with computers in a visual manner. They often have their audio turned off, or if not, they're just often listening to music or voice recordings while they work.

Most people would consider it an inconvenience to have to turn off their music or turn up their speakers in order to take a test in order to access a resource.

There is still a valid case to be made for developing a reliable reverse Turing test for blind persons that uses audio cues, but that is beyond the scope of this invention.

SUMMARY OF THE INVENTION

The invention is a system and method for restricting access to a computer system, resource, or network to live persons, and for preventing the execution of automated scripts via an interface intended for human interaction.

When queried for access to a protected resource, computer system, or network, the system will respond with a challenge requiring unknown petitioners to solve a visual puzzle before proceeding, said puzzle consisting of a collection of apparently random objects.

The subject of the test must either recognize a semantic or symbolic association between two or more objects, or isolate an object that does not belong with the others, indicating their selection with the pointing device on their local computer.

If the subject of the test succeeds in passing the test, they are granted access to the requested resource, computer system, or network. If not, they are invited to attempt the test again, up to a configurable maximum retests, after which time their request is simply ignored.

In the drawings, which form a part of this specification,

FIG. 1 is a logical diagram showing the system for challenging and testing unknown petitioners for access to a protected resource; and FIG. 2 shows the layout of a composite test image as generated by the system.

DETAILED DESCRIPTION OF THE INVENTION

The invention is a system and method for restricting assess to a computer system, resource, or network to live persons, and by extension for preventing the execution of automated scripts via an interface intended for human interaction.

In other words, it's a system to prevent spammers and malicious coders from exploiting web forms or information request pages that are intended for use by humans.

As shown in FIG. 1, a Semantic Context Database [107] is created for an arbitrary collection of photo objects, (images in which a single object has been isolated against a transparent background), which are stored in an Images Database [106]. Each entry in the Semantic Context Database must be created and aggregated by human operators [111]. Each image is identified with a unique ID, and associated with metadata that describes the image qualitatively, functionally, and emotively.

When a request is made by an unknown agent [101] to access a protected resource [104], the Challenge/Response Agent [103] creates a session for the Petitioning Agent's computer, and invokes the Test Creation Engine [105] to create a reverse Turing test for the session. In practice, of course, the Petitioning Agent [101] may or may not turn out to be a human user.

The Test Creation Engine queries the Images Database for a random image, which becomes the Key Image for the test. The Test Creation Engine will then randomly determine the test type, which can either be associative or exclusive.

If the test is associative, the Test Creation Engine will first query the Semantic Context Database for the ID of an image which has associated metadata that closely corresponds to that of the Key Image in one or more metadata categories. The number of points of correspondence and the number of categories of correspondence are configurable to allow a system administrator to modify the difficulty of the test.

At this point, the Test Creation Engine will have the unique IDs of two photo objects that a human being would be likely to associate as being related. The Test Creation Engine will then query the Semantic Context Database for a collection of image IDs which have associated metadata which has very few points of correspondence with the representative metadata for the Key image. The number of additional images and the number of points of correspondence are configurable to allow a system administrator to modify the difficulty of the test.

If the test is exclusive, the Test Creation Engine will first query the Semantic Context Database for the unique IDs of a collection of multiple images which have associated metadata that closely corresponds to that of the Key Image in one or more metadata categories. The number of points of correspondence and the number of categories are configurable to allow a system administrator to modify the difficulty of the test.

At this point, the Test Creation Engine will have the unique IDs of a collection of photo objects that a human being would likely associate as being related. The Test Creation Engine will then query the Semantic Context Database for a single image which has very few points of correspondence with the representative metadata for the Key Image. The number of points of correspondence are configurable to allow a system administrator to modify the difficulty of the test.

The Test Creation Engine will then pass the ID of the Key Image, the IDs of the other images, and the test type, (associative or exclusive) to the Challenge/Response Agent.

The Challenge/Response Agent would then invoke the Localization Engine [108] to create an instruction string for the user. In the case of an associative test, the string would name the Key Image in the test and instruct the user to find the matching item. In the case of an exclusive test it would instruct the user to find the object that doesn't belong.

The Challenge/Response Agent will then invoke the Image Composition Engine [109], and pass it the IDs of the images to be used in the test, together with the localized instruction string.

The Image Composition Engine will use these IDs to create a composite image designed to frustrate machine interpretation. As shown in FIG. 2, the Image Composition Engine will first select a random background image [201] from the Images Database. The background image will have been selected as a good candidate for the purpose, and will feature a strong pattern or random noise. The Image Composition Engine will then request all of the test images [202-204] from the Images Database, and position them at random positions on top of the background image.

The position of the test images can be completely random, so long as they are completely contained within the confines of the background image, and do not overlap. Each test image will have a slight degree of random scaling and rotation applied to it. In some cases, the UV coordinates of the test images may be inverted prior to rotation in order to flip the image. Each test image will also be alpha blended against the background image by a small random amount in order to make segmentation of the photo object more difficult for a machine process.

All of the parameters used by the Image Composition Engine are configurable in order to allow a system administrator to modify the difficulty of the test.

Once all of the test photo objects are assembled on the background image, a special noise pattern is created and applied to the entire composite image [205]. The blending noise is created by generating a collection of several small, but regular shapes—like plus signs, circles, and squares—and positioning them randomly on the composite image. Each shape would have a slightly different colour value, and it would be blended at a low alpha value by multiplying, adding or subtracting the colour value from the underlying pixels.

The blend mode used and the alpha value at which it is applied would be random for each shape instance.

The resulting noise would be easily dismissed by a human viewer, but it would greatly complicate the process of isolating photo objects in the scene for a machine process.

Last of all, the Image Composition Engine would render the text in the instruction string [206], and superimpose it on a space reserved either at the top or the bottom of the composite test image.

The Image Composition Engine will also create an image map corresponding to the composite test image that would track the position of the Key image and of the other test images. Once the composite test image and the image map are created, the Image Composition Engine will pass them to the Challenge/Response Agent.

Once the test is assembled, and the test image is created, the Challenge/Response agent will transmit the test image to a small Client-Side Test Application [112] on the Petitioning Agent's computer. The client-side application can be delivered as part of an HTML document, and can be implemented using any of a variety of common client-side application technologies, including AJAX, Java, Flash, or the Silverlight framework. The client/server communications for the challenge and the test do not require encryption.

The Client-Side Test Application will display the test image and instruct the Petitioning Agent to use their pointing device complete the test. The rest of the instructions are embedded in the instruction string which is superimposed on the test image.

If the Petitioning Agent turns out to be a human user, they can simply use their mouse or pointing device to draw a line connecting the key image with its match [207], (if the test is associative), or to circle the one image that doesn't belong with the others, (if the test is exclusive).

The Client-Side Test Application will listen for a press event from the pointing device on the Petitioning Agent's computer. On press, (whether it is a button event on a mouse or a pressure event on a stylus or touch screen), the Client-Side Test Application will start recording the position of the pointing device every few milliseconds.

Once the Petitioning Agent or user releases the mouse button or otherwise generates a release event for the pointing device, the Client-Side Test Application will stop recording the position of the pointing device, and will transmit the data it has collected to the Challenge/Response Agent.

The Challenge/Response Agent will then pass the collected data and the image map for that test to the Test Evaluation Engine [110]. The Test Evaluation Engine will compare the pointing device position data to the image map.

In the case of an associative test, it will look for the start and end points of the line created by the pointing device, and check to see if they correspond to the position of the key image and the matching image. The Test Evaluation Engine will also check to see if the line created by the pointing device intersects any images that are unrelated to the key image. Failure on either of these two conditions would constitute a failure of the test.

In the case of an exclusive test, the Test Evaluation Engine will check to see if the line created by the pointing device encloses the area occupied by the image that doesn't belong with the others. It will also verify that the line created by the pointing device does not enclose any of the other photo objects in the test image. Failure on either of these two conditions would constitute a failure of the test.

Once it has evaluated the test data, the Test Evaluation Engine will pass the test results back to the Challenge/Response Agent.

If the Petitioning Agent has passed the test, the Challenge/Response Agent will allow the Petitioning Agent access to the requested resource. If not, it will return a message advising the Petitioning Agent of the failure.

In the case of a failure, the Petitioning Agent will be given the opportunity to take the test again, up to a maximum number of retests, which would be configurable by an administrator of the system.

The embodiments of the invention in which an exclusive property or privilege is claimed are defined as follows:

1. A computer implemented method for restricting access to a computer system, resource, or network to humans via an interface displaying a reverse Turing test that exploits the semantic, symbolic, and contextual associations humans instinctively form between images of objects, by requiring the unknown subject of a test to indicate relationships between objects, the method comprising:
   a) managing, at the computing device, a first session when a protected resource is requested by an unknown subject;
   b) generating, at the computing device, a unique test for each session, based on a combination of configurable and random parameters, said test comprising the images of a plurality of disparate objects, of which a plurality share a meaningful semantic relationship;
   wherein the test comprises one of a associative test, requiring the unknown subject to match two objects that share a semantic relationship, or an exclusive test, requiring the unknown subject to isolate a single object which fails to share a semantic relationship with a plurality of other objects;
   c) localizing, at the computing device, instructions to the unknown subject, by generating a translated instruction string;
   d) composing, at the computing device, the images which comprise the test into a single flattened composite image;
   e) administering the test to the unknown subject;
   f) evaluating, at the computing device, the response from the unknown subject and providing a pass or fail result, and allowing or denying access to that resource is based on the result; and
   g) repeating steps a) through h) in a second session using the alternate of the exclusive test or the associative test that was used in the first iteration for the same or different unknown subject.

2. The method of claim 1, wherein the instruction further comprises: a translated instruction string that will guide the user to draw a line joining the images of objects that share a semantic relationship, if the test is an associative test, or to circle the image that does not belong, if the test is an exclusive test.

3. The method of claim 1, further comprising a step in which: a query at an images database for the collection of disparate objects for assembly into the single composite test image, and rendering the translated instruction string on top of the composite test image.

4. The method according to claim 1,
   wherein the associative test further comprises a query in a semantic context database for an object ID of an object that corresponds to a key image selected from an images database, a single object ID that shares a meaningful semantic association with that key object, and a collection consisting of a plurality of object IDs that do not share any meaningful semantic relationship with the key object; and
   wherein the exclusive test further comprises a query in a semantic context database for an object ID of an object that corresponds to a key image selected from an Images database, and a collection of a plurality of object IDs that share a meaningful semantic relationship with each other, but share no meaningful semantic relationship with the key object.

5. A system for restricting access to a computer system, resource, or network to humans via an interface displaying a reverse Turing test that exploits the semantic, symbolic, and contextual associations humans instinctively form between images of objects, by requiring the unknown subject of a test to indicate relationships between objects, the system comprising:
one or more CPUs and one or more memory which comprise instructions that when executed implement:
a) a challenge and response agent that manages a first session when a protected resource is requested by an unknown subject;
b) a test creation engine that generates a unique test for each session, based on a combination of configurable and random parameters, said test comprising the images of a plurality of disparate objects, of which a plurality share a meaningful semantic relationship;
wherein the test comprises one of a associative test, requiring the unknown subject to match two objects that share a semantic relationship, or an exclusive test, requiring the unknown subject to isolate a single object which fails to share a semantic relationship with a plurality of other objects;
c) a localization engine which localizes instructions to the unknown subject, by generating a translated instruction string;
d) an image composition engine that composes the images which comprise the test into a single flattened composite image;
e) a client-side test application that administers the test to the unknown subject;
f) a test evaluation engine that evaluates the results from the client-side test application and provides a pass or fail result to the challenge and response agent;
wherein the challenge and response agent allows or denies access to the resource based on the results; and
g) repeating steps a) through h) in a second session using the alternate of the exclusive test or the associative test that was used in the first session for the same or different unknown subject via the same or different client-side test application.

6. The system of claim 5, wherein the challenge and response agent will respond to any request from an unknown subject for a protected resource, system or network by creating a test session and invoking the test creation engine.

7. The system of claim 5, wherein the test creation engine will instantiate a new test which can be determined either by configuration or by random selection to be of either associative or exclusive logic, and request a single random key image ID from an images database.

8. The system of claim 5, wherein the test creation engine further queries the localization engine for a translated instruction string that will guide the user to draw a line joining the images of objects that share a semantic relationship, if the test is an associative test, or to circle the image that doesn't belong, if the test is an exclusive test.

9. The system of claim 8, wherein the image composition engine further creates an image map that stores in the pixels of the image the placement of the individual image objects contained in the composite test image.

10. The system of claim 5, wherein the test creation engine will the pass a collection of image IDs associated with the objects selected for the test, and the translated instruction string to the image composition engine, which will in turn create a composite test image.

11. The system of claim 5, wherein the challenge and response agent will transmit the composite test image to a client-side test application, which can be embedded in an HTML document and is executed on the client computer operated by the unknown subject.

12. The system of claim 5, wherein the client-side test application will instruct the unknown subject to use the pointing device on their local computing device to complete the instructions embedded in the composite test image.

13. The system of claim 5, wherein the client-side test application will start recording the position of the pointing device on the unknown subject's local computing device at intervals of a few milliseconds when it receives a press event from the pointing device, and will stop recording and transmit the collected position data back to the challenge and response agent when it receives a release event from the pointing device.

14. The system of claim 5, wherein the challenge and response agent passes the test data to the test evaluation engine, which will plot the position data collected for the pointing device on the unknown subject's computing device, and compare it to positions of the separate test sub-images as recorded in the image map corresponding to the composite test image.

15. The system of claim 14, wherein the test evaluation engine will further make the appropriate examination for an associative or exclusive test;
wherein if the test is an associative test, the test evaluation engine will return a pass result if the pointing device data forms a line connecting the images of objects that share a semantic relationship without intersecting any of the other unrelated image objects in the composite test image, and a failure result if these conditions are not met;
wherein if the test is an exclusive test, the test evaluation engine will return a pass result if the pointing device data forms a line that encloses the image object that fails to share a semantic relationship without enclosing or intersecting any of the other image objects in the composite test image, and a failure result if these conditions are not met.

16. The system of claim 5, wherein if the test evaluation engine returns a pass result, the challenge and response agent will return a pass result to allow the unknown subject access to the requested computer system, resource, or network; and if it returns a failure result, the challenge and response agent will transmit a failure notification to the unknown subject.

17. The system of claim 5, wherein if the unknown subject fails to pass a test, the challenge and response agent will allow the unknown subject to request a new test, up to a maximum number of retests; after which, the challenge and response agent will simply refuse all requests from the unknown subject for the duration of a cool-down time; the maximum number of retests and cool-down interval being configurable by an administrator of the system.

* * * * *